United States Patent
Kim et al.

(10) Patent No.: US 10,237,509 B1
(45) Date of Patent: Mar. 19, 2019

(54) SYSTEMS WITH KEYBOARDS AND HEAD-MOUNTED DISPLAYS

(71) Applicant: Apple Inc., Cupertino, CA (US)

(72) Inventors: Seung Wook Kim, Cupertino, CA (US); Camille Moussette, Los Gatos, CA (US); Adam S. Meyer, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/599,310

(22) Filed: May 18, 2017

Related U.S. Application Data

(60) Provisional application No. 62/371,594, filed on Aug. 5, 2016.

(51) Int. Cl.
| | |
|---|---|
| H04N 5/445 | (2011.01) |
| G06F 3/023 | (2006.01) |
| G06F 3/0488 | (2013.01) |
| G06F 1/16 | (2006.01) |

(52) U.S. Cl.
CPC ......... H04N 5/44504 (2013.01); G06F 1/163 (2013.01); G06F 3/0233 (2013.01); G06F 3/04886 (2013.01)

(58) Field of Classification Search
CPC ... H04N 5/44504; G06F 1/163; G06F 3/0233; G06F 3/04886
See application file for complete search history.

(56) References Cited

U.S. PATENT DOCUMENTS

| | | | |
|---|---|---|---|
| 6,388,657 B1 | 5/2002 | Natoli | |
| 6,600,480 B2 | 7/2003 | Natoli | |
| 6,611,253 B1 | 8/2003 | Cohen | |
| 7,754,955 B2 | 7/2010 | Egan | |
| 8,206,047 B1* | 6/2012 | Isaac | G06F 3/04886 400/472 |
| 2002/0060669 A1* | 5/2002 | Sze | G06F 3/017 345/173 |
| 2012/0206357 A1* | 8/2012 | Vandeputte | G06F 3/0488 345/163 |
| 2013/0050098 A1* | 2/2013 | Ide | G06F 3/04886 345/173 |

(Continued)

FOREIGN PATENT DOCUMENTS

EP 2693255 2/2014

*Primary Examiner* — Rodney Amadiz
(74) *Attorney, Agent, or Firm* — Treyz Law Group, P.C.; G. Victor Treyz; Joseph F. Guihan

(57) ABSTRACT

A system may be provided in which input is gathered from a user with input-output devices. The input-output devices may include physical keyboards, touch screen displays, data gloves, and other input-output devices. Control circuitry in the system may use a head-mounted display, a display on a keyboard, and a display in a tablet computer or other electronic device to display images. Virtual reality content may be presented to a user with the head-mounted display. The virtual reality content may include virtual documents with virtual text, virtual keyboards with virtual keys, and other virtual objects. A virtual keyboard may be overlaid on top of a physical keyboard or on top of a keyboard display or touch screen display in a tablet computer or other electronic device. Virtual key labels may be updated in response to user key press input and other input.

10 Claims, 9 Drawing Sheets

(56) References Cited

U.S. PATENT DOCUMENTS

| | | | | |
|---|---|---|---|---|
| 2014/0035819 A1* | 2/2014 | Griffin | ............... | G06F 3/0238 345/168 |
| 2015/0378552 A1* | 12/2015 | Pasquero | ............. | G06F 3/044 345/168 |
| 2018/0024707 A1* | 1/2018 | Kato | .................. | G06F 3/0488 715/810 |

* cited by examiner

SYSTEMS WITH KEYBOARDS AND HEAD-MOUNTED DISPLAYS

This application claims the benefit of provisional patent application No. 62/371,594, filed Aug. 5, 2016, which is hereby incorporated by reference herein in its entirety.

FIELD

This relates generally to head-mounted displays, and, more particularly, to gathering input with devices such as keyboards while using head-mounted displays.

BACKGROUND

Computers with displays can present simulated environments to users. Head-mounted displays are available that enhance the immersive nature of simulated environments. A user with a head-mounted display may be presented with virtual reality worlds. A user may manipulate virtual objects in the virtual worlds by supplying input through data gloves or other input devices.

Augmented reality is a type of virtual reality in which simulated computer content is merged with the real world. Augmented reality systems may, for example, use head-mounted displays to display virtual objects intermingled with real-world objects.

Although a wide variety of virtual input devices can be constructed for a user in a simulated environment, tasks such as supplying text input can be cumbersome in simulated environments. For example, a user in a simulated environment may not be provided with physical feedback of the type that naturally arises when interacting with a physical keyboard.

SUMMARY

A system may be provided in which input is gathered from a user with input-output devices. The input-output devices may include physical keyboards, touch screen displays, data gloves, proximity sensors, cameras, and other input-output devices. A user may supply text input for a word processing program or other application by typing on a physical keyboard, by supplying touch input to a touch screen display, or by supplying other input to the input-output devices.

Control circuitry in the system may use a head-mounted display or other suitable display to display virtual reality content for the user. The virtual reality content may include a virtual keyboard with virtual key labels. The virtual keyboard may be overlaid on top of a physical keyboard so that each virtual key overlaps a respective physical key in the keyboard. The user may type on the physical keyboard while observing the virtual key labels. Virtual key labels may be updated in response to user key press input and other input. For example, if a user presses on a letter key on the keyboard, a set of corresponding accented letter options may be displayed as virtual key labels. The user may then press on a one of the accented letter options to select a desired accented letter.

The system may include a display such as a touch screen display that forms part of the physical keyboard, may include touch screen displays in tablet computers and other electronic devices, may include cameras and other equipment for monitoring a user's gaze and finger motions, and/or may include other input and output devices. A touch screen display on a physical keyboard may be used to display dynamically reconfigurable touch screen options. These options may include, for example, accented letter options corresponding to a pressed letter key on the physical keyboard. The head-mounted display may be used to overlay virtual key labels onto a touch screen display on a physical keyboard or onto a touch screen display in a tablet computer or other electronic device. Touch screen displays may display content that does not reveal virtual text and other current virtual reality content being viewed by the user with the head-mounted display. For example, a user may supply text to a touch screen display. The text may be incorporated into a virtual document that is displayed for the user with the head-mounted display while the touch screen display is displaying blank content or other content that does not reveal the text.

DETAILED DESCRIPTION

Figure 1:
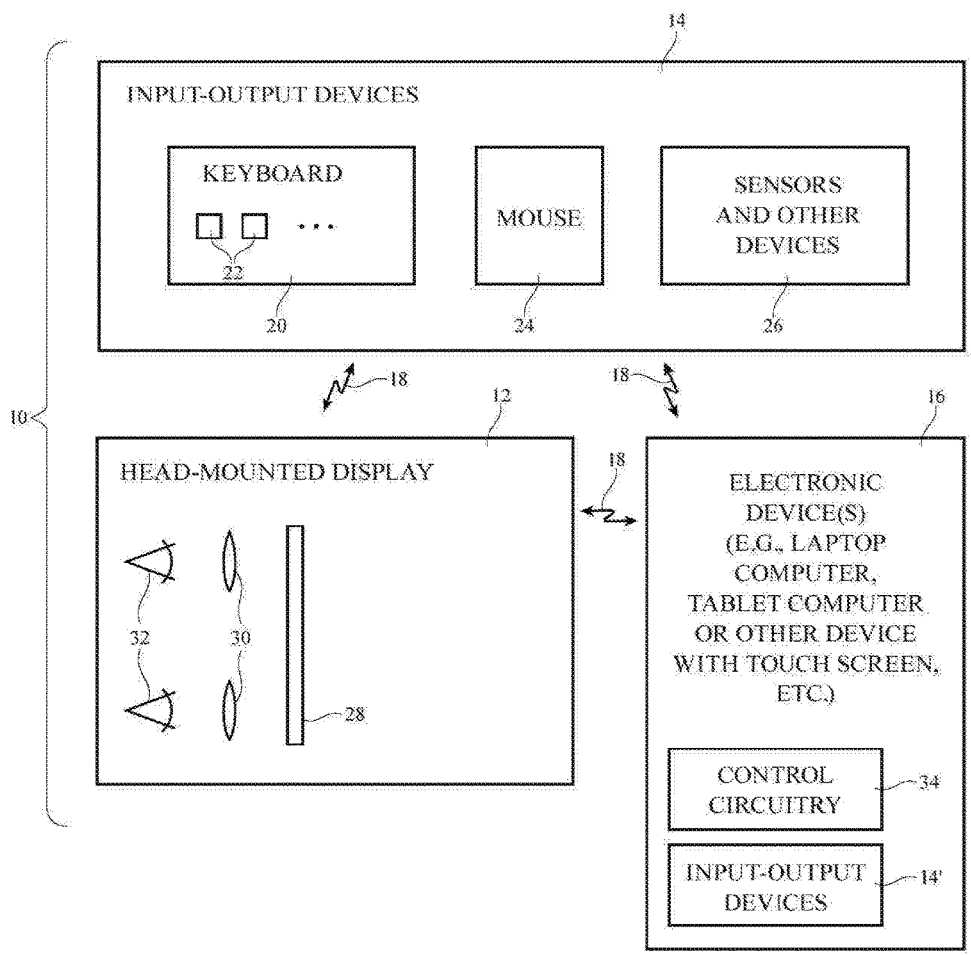
FIG. 1 is a schematic diagram of an illustrative virtual reality system in accordance with an embodiment.

An illustrative system for providing a user with computer-simulated content is shown in FIG. 1. As shown in FIG. 1, system 10 may include a display such as display 12, electronic devices 16, and input-output devices 14. Display 12 may be used to present images to a user such as computer-simulated images that create a virtual world (sometimes referred to as a virtual reality or augmented reality). Input-output devices 14 may be used to gather input such as user input and may be used to supply output such as audio output for a user, haptic output for a user, etc. Electronic devices 16 may include tablet computers and other devices. Devices 16 may include input-output devices such as touch screens and may have control circuitry for supporting the operation of system 10. Control circuitry for supporting the operation of system 10 may also be incorporated into display 12 and input-output devices 14.

Display 12 may be, for example, a head mounted display (sometimes referred to as virtual reality glasses or augmented reality glasses). Display 12 may include a display component such as display component (display) 28. Display component 28 may be formed from one or more displays such as liquid crystal displays, organic light-emitting diode displays, plasma displays, electrophoretic displays, microelectromechanical systems displays, electrowetting displays, displays with arrays of crystalline semiconductor light-emitting diode dies, and/or other types of displays. If desired, display (device) 12 may be a portable electronic device such as a cellular telephone, tablet computer, watch, may be a display device in which component 28 is mounted on a support structure that is not attached to a user's head, or may be any other suitable display (device) that contains a display such as component 28. Configurations in which display 12 is a head-mounted display may sometimes be described herein as an example. This is, however, merely illustrative. Display 12 may be supported using any suitable support structure, may be incorporated into any suitable device housing, and may or may not be worn by a user.

During operation, images may be displayed for user on an array of pixels on display component 28. The images may include computer-simulated images (e.g., images produced by control circuitry in devices 16 and/or other control circuitry in system 10), may include real-time images from a video camera, and/or may include other visual content.

Display 12 may include an optical system such as optical system 30. Optical system 30 may include one or more optical components such as lenses, beam splitters and other optical combiners, filters, and other optical components for presenting images from display component 28 to the eyes of the user (see, e.g., eyes 32 in FIG. 1). In some configurations, the images produced by display 12 may block the user's view of the user's surrounding environment. In other configurations, such as arrangements in which optical system 30 includes optical combiners and/or when display component 28 is transparent, images produced by display component 28 may be merged with the user's view of the real world. As an example, a user may view real world objects while display component 28 is being used to supply labels or other information that is overlaid on selected portions of the user's view of the real world. In some arrangements, a camera may capture images of the real world and these real world images may be digitally combined with computer simulated content (e.g., optical combiner structures in system 30 may be replaced by or used in conjunction with digital image combiners). If desired, computer-simulated content can be presented as the sole content viewable by the user (i.e., the user's field of view may be restricted to display component 28 and optical system 30 may include lenses to allow the user to view images on display component 28 without optically merging real world content).

Input-output devices 14, electronic devices 16, and display 12 may communicate over communications links 18. Communications links 18 may include wired paths (e.g., cables, etc.) and/or wireless paths (e.g., wireless local area network paths, etc.).

As shown in FIG. 1, input-output devices 14 may include devices such as physical keyboard 20. Keyboard 20 may include physical keyboard keys 22. A user may type on keys 22 to enter text, to move a cursor, and/or to take other suitable action in system 10. A user may move cursors and take other actions using pointing devices such as mouse 24. Sensors and other input devices 26 in input-output devices 14 may be used to gather information on the environment in which system 10 is operating and/or to gather user input. For example, devices 26 may include sensors such as accelerometers, temperature sensors, ambient light sensors, proximity sensors, touch sensors, touch screen displays (e.g., touch sensors that overlap displays), force sensors, magnetic sensors, gas sensors, humidity sensors, microphones, cameras (image sensors), etc. Devices 26 may also include buttons, track pads, joysticks, and other input devices. Devices 26 may be used to provide output. For example, devices 26 may include speakers for providing sound to a user, haptic output devices for providing a user with haptic feedback, and/or other output devices.

Electronic devices 16 may include laptop computers, tablet computers, cellular telephones, media players, wristwatches, desktop computers, and/or other electronic equipment. Devices 16 may include input-output devices 14' (e.g., keyboards, touch screens such as displays overlapped with touch sensors in tablet computers and other devices, microphones, cameras, and/or other devices such as input-output devices 14).

Electronic devices 16 may include control circuitry 34. The control circuitry from one or more of devices 16 and/or control circuitry in input-output devices 14 and/or display 12 may be used to run software and thereby support the operation of system 10. The control circuitry of system 10 (e.g., control circuitry 34) may include storage such as electrically erasable programmable read only memory, random-access memory, hard-disk drives, removable storage media, and other storage devices. Control circuitry 34 may also include processors such as microprocessors, microcontrollers, digital signal processors, baseband processors, application-specific integrated circuits, and/or other processing circuitry.

During operation of system 10, software may be loaded on control circuitry 34. The software may contain code (instructions) that are stored in non-transitory storage in control circuitry 34. The code may be used to configure control circuitry 34 to perform operations related to gathering input from input-output devices in system 10, to perform operations related to supplying output with input-output devices in system 10, to perform operations related to displaying content for a user with display 12 (e.g., the use of control circuitry to display virtual objects on display 12), and to perform other operations in system 10. As an example, software running on control circuitry 34 may configure control circuitry 34 to display virtual reality content on display component 28 while gathering and responding to input from input-output devices 14. Control circuitry such as control circuitry 34 of devices 16 may be included in input-output devices 14 and/or display 12. Display 12 may, if desired, include buttons, a camera (e.g., a camera for gathering images of eyes 32 for supporting gaze detection operations), and/or other input-output devices (e.g., devices such as input-output devices 14).

In arrangements in which a relatively large amount of real-world video is presented to a user on display component 28 and/or in which optical system 30 allows large amounts of real-world viewing, relatively small amounts of computer-generated data may be presented in the field-of-view of the user's vision. In this type of arrangement, a user may easily view objects in the user's surroundings such as keyboard 20, mouse 24, etc.

In other arrangements, however, optical system 30 may not allow a user to directly view the user's surroundings and/or control circuitry 34 may present large amounts of virtual reality content relative to video of the user's real world surroundings (e.g., little or no real-world content may be viewed by the user, either because optical system 30 is not configured to allow the user to view anything other than display component 28 and/or because real-time video of the user's surroundings is not being presented on component 28). In configurations where it is difficult or impossible to view input-output devices such as keyboard 20, mouse 24, a touch screen or other objects in the vicinity of the user or in other configurations of system 10, it may be desirable to overlay virtual representations of keyboard keys and/or other virtual objects on top of keyboard 20, mouse 24, a touch screen in input-output devices 14 and/or 14', or other input-output devices.

As just one example, a virtual keyboard may be overlaid on top of a real-world keyboard. For example, a camera or other input-output device may be used to capture images of keyboard 20. Control circuitry 34 may process the captured images to determine the present location of keyboard 20. Keyboard 20 may, if desired, contain registration fiducials or other features that facilitate image processing operations and help allow control circuitry 34 to accurately determine the position and orientation of keyboard 20. Based on the known location of keyboard 20, control circuitry 34 may produce simulated content such as a virtual representation of keyboard 20. The virtual representation of keyboard 20 may be overlaid on top of keyboard 20 (i.e., in the same position and orientation as keyboard 20).

If desired, other virtual objects may be overlaid on top of corresponding devices in input-output devices 14 and/or 14'. For example, a virtual touch screen keyboard with virtual key labels or other virtual content may be overlaid on top of a touch screen in a tablet computer or other touch screen device, a virtual mouse object may be overlaid on top of mouse 24, etc. Configurations in which system 10 overlays a virtual keyboard on keyboard 20 may sometimes be described herein as an example.

When a virtual keyboard is being overlaid on top of keyboard 20, custom labels may be created for each of keys 22. This allows a user to switch between multiple keyboard layouts and allows context-dependent key labels and other virtual keyboard content to be presented as overlays on keys 22.

The virtual reality representation of keyboard 20 and associated virtual key labels that are displayed on top of keys 22 help inform a user of the presence of keyboard 20 and allow custom key functions to be presented.

Unlike other real world objects surrounding the user, the keyboard in system 10 can be viewed in virtual form. The presence of the virtual reality version of the keyboard on top of the physical keyboard therefore helps inform the user that the physical keyboard is present and available to gather input for system 10. The rest of the user's virtual world may have little or no relationship to the user's physical surroundings. Because physical keyboard 20 is represented virtually, a user is informed of the presence of the physical keyboard and can use the physical keyboard to type documents and perform other tasks.

To inform the user of custom key functions, control circuitry 32 can overlay custom key labels and/or other virtual reality content on keys 22. If, for example, a user is typing in a word processor in English, a set of English alphanumeric key labels may be displayed on top of keys 22. On the other hand, if the user is typing in Greek, the English key labels can be replaced with Greek letters. Keyboard layouts and key labels can be adjusted depending on which application is being used by the user (e.g., whether a game application is running on control circuitry 34, whether a word processing application is running on circuitry 34, etc.), may be adjusted manually (e.g., in response to user input), may be adjusted based on which language is being used by an application running on control circuitry 34, may be adjusted during a virtual reality game as a function of context in the game (e.g., time, virtual location, etc.), and/or may be adjusted based on other criteria. In some scenarios, keyboard key press input may be used in adjusting the content of virtual key labels. As an example, a set of alternate letters (accented letters, etc.) that relate to a given English alphabet letter may be presented upon receiving an extended key press of the given English alphabet letter from a user. Virtual key labels may also be selected in response to two-key, three-key, or more than three-key keyboard key combinations (e.g., command-shift, etc.), in response to key press patterns (e.g., two or more quick key presses in succession, etc.), and/or in response to other key press input.

Figure 2:
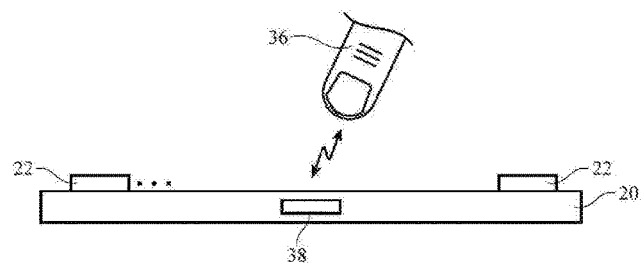
FIG. 2 is a side view of an illustrative keyboard having a proximity sensor in accordance with an embodiment.

FIGS. 2-7 show illustrative arrangements for gathering user input from a user of system 10. In the example of FIG. 2, keyboard 20 has a capacitance sensor, light-based sensor, acoustic sensor, camera, or other sensor 38 that senses external objects such as user finger 36. Sensor 38, which may sometimes be referred to as a proximity sensor or gesture detection sensor, may be used to detect gestures (finger or hand swipes, etc.), may be used to detect hovering motions, may be used to track finger movements (e.g., to position a cursor), and/or may be used to detect other input from one or more fingers 36, a user's hand, other user body parts, and/or other external objects. Virtual reality objects may be moved and other actions taken in system 10 based on input gathered with sensor 38.

Figure 3:
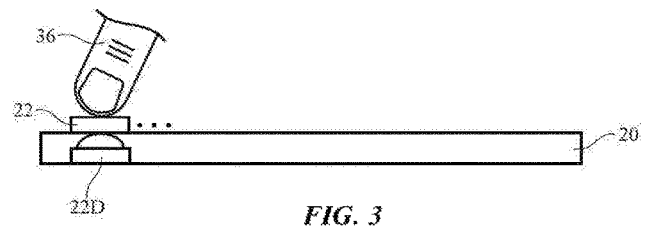
FIG. 3 is a side view of an illustrative keyboard having showing how keys may be provided with key switches or other components to gather key press input from a user in accordance with an embodiment.

A user may also supply input to keys 22 by pressing keys 22 with finger 36. As shown in FIG. 3, keys 22 may each have a movable key member that bears against a respective dome switch or other key switch 22D. When the user presses inwardly (downwardly in the orientation of FIG. 3) on a given key 22, the key switch 22D of that key will change state (e.g., the switch will transition from an open state to a closed state). Control circuitry 34 may monitor the state of switches 22D to gather key press input.

Figure 4:
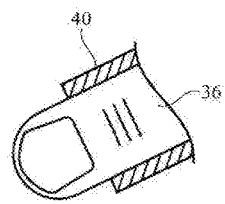
FIG. 4 is a side view of a portion of a user's hand showing how data gloves can be used to gather user input in accordance with an embodiment.

As shown in the example of FIG. 4, a user's fingers such as finger 36 may be received within one or more data gloves such as glove 40. Glove 40 may include resistance sensors, capacitive sensors, force sensors, strain gauges, optical sensors, accelerometer, gyroscopes, and/or other sensors for detection motion and orientation of each of fingers 36 (or a user's hand, etc.). A user may supply typing input by moving fingers 36 and by capturing information on the movement of each finger using sensors associated with the fingers of glove 40. Gloves such as glove 40 may also be used to capture gestures, finger motions across a table top (e.g., to move a cursor), and other input. If desired, a user may type on keyboard 20 to supply text input, may type on a virtual keypad using glove 40 to supply additional text input, may supply a finger gesture to a virtual trackpad or physical trackpad using glove 40, or may supply other input to system 10 using data gloves such as glove 40. If desired, text input can be supplied exclusively using keyboard 20 while a data glove(s) such as glove 40 is used to capture other user input (e.g., finger input on a virtual track pad, etc.).

Figure 5:
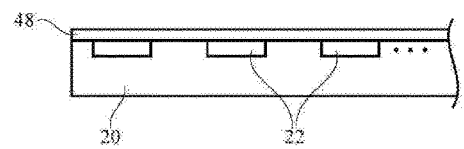
FIG. 5 is a cross-sectional side view of an illustrative keyboard having keys that are overlapped by a sensor such as a touch sensor in accordance with an embodiment.

FIG. 5 is a cross-sectional side view of keyboard 20 in an illustrative configuration in which keyboard 20 is covered with a sensor layer such as layer 48. Layer 48 may include touch sensors, force sensors (e.g., capacitive force sensors, strain gauge force sensors, etc.), optical sensors, and/or other sensors for gathering user input. For example, layer 48 may be a layer of fabric, a polymer substrate, or other layer that includes an array of capacitive touch sensor electrodes that form a capacitive touch sensor. The capacitive touch sensor can be used to gather swiping gesture input across the surface of keyboard 20 and/or other touch input. When a user presses inwardly on keys 22, keys 22 may detect key press input.

Figure 6:
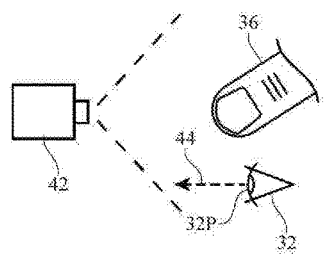
FIG. 6 is a side view of an illustrative camera of the type that may be used to perform gaze detection operations and gesture recognition operations in accordance with an embodiment.

FIG. 6 is a diagram showing how system 10 may include input-output devices such as camera 42. Camera 42 may monitor the direction of view (e.g., direction 44) of a user's eyes (e.g., eye 32) by monitoring the location of the user's pupils (e.g., pupil 32P) within each eye 32. This type of operation, which may sometimes be referred to as gaze detection, may be used to determine when a user's gaze is directed toward a particular key 22 on keyboard 20, is directed towards a particular virtual object on display 12 that is not associated with keys 22, and/or is directed in other particular directions and/or has other detectable attributes. In addition to capturing gaze input, camera 42 may monitor the location and movements associated with the user's hands or other body parts and/or the motion of other external objects (e.g., pointing devices, etc.). For example, camera 42 may track the motion of a user's fingers such as fingers 36.

Figure 7:
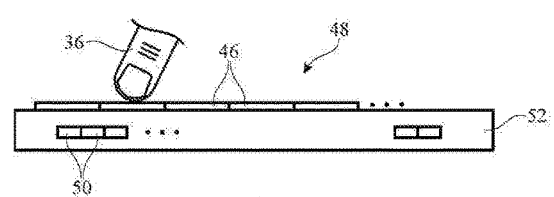
FIG. 7 is a cross-sectional side view of an illustrative touch screen display in a tablet computer or other electronic device showing how a touch sensor in the touch screen display may be used in gathering user input in accordance with an embodiment.

In addition to gathering user input with an image sensor such as camera 42 of FIG. 6, input-output devices may include touch screen displays for gathering user input, as shown in FIG. 7. In the illustrative configuration of FIG. 7, a user is supplying touch input to a touch sensor on the surface of touch screen display 48. The touch sensor may be formed from an array of capacitive touch sensor electrodes 46 (e.g., an array of transparent conductive electrodes such as indium tin oxide electrodes). The touch sensor may be formed on the surface of display device 52. Display device 52 may have circuitry that forms an array of pixels 50. Display device 52 may be an organic light-emitting diode display, a liquid crystal display, a display formed from an array of crystalline semiconductor light-emitting diode dies, an electrophoretic display, a plasma display, a microelectromechanical systems display, an electrowetting display, or other suitable display.

When a user is viewing images presented by display 12, the content produced by pixels 50 may be merged with the images presented by display 12 and/or may be replaced with overlaid virtual content from display 12. Overlaid content may include a customized virtual keyboard or other virtual input device that is overlaid on top of predetermined touch input areas on touch screen display 48. For example, the overlaid content may contain virtual key labels that the user may select to supply input to touch screen display 48. The input supplied to touch screen display 48 may be used by system 10. For example, if a user is composing a document, the text entered by the user with touch screen display 48 may be presented by display 12 as virtual text in a virtual document on a virtual display. In the real world, touch screen display 48 may be black or may display a screen saver, dummy text document, or other content. The content displayed by touch screen display 48 need not be related to the text document being composed by the user on the virtual display, so the user's text document can remain private and need not be exposed to the public on touch screen display 48.

Figure 8:
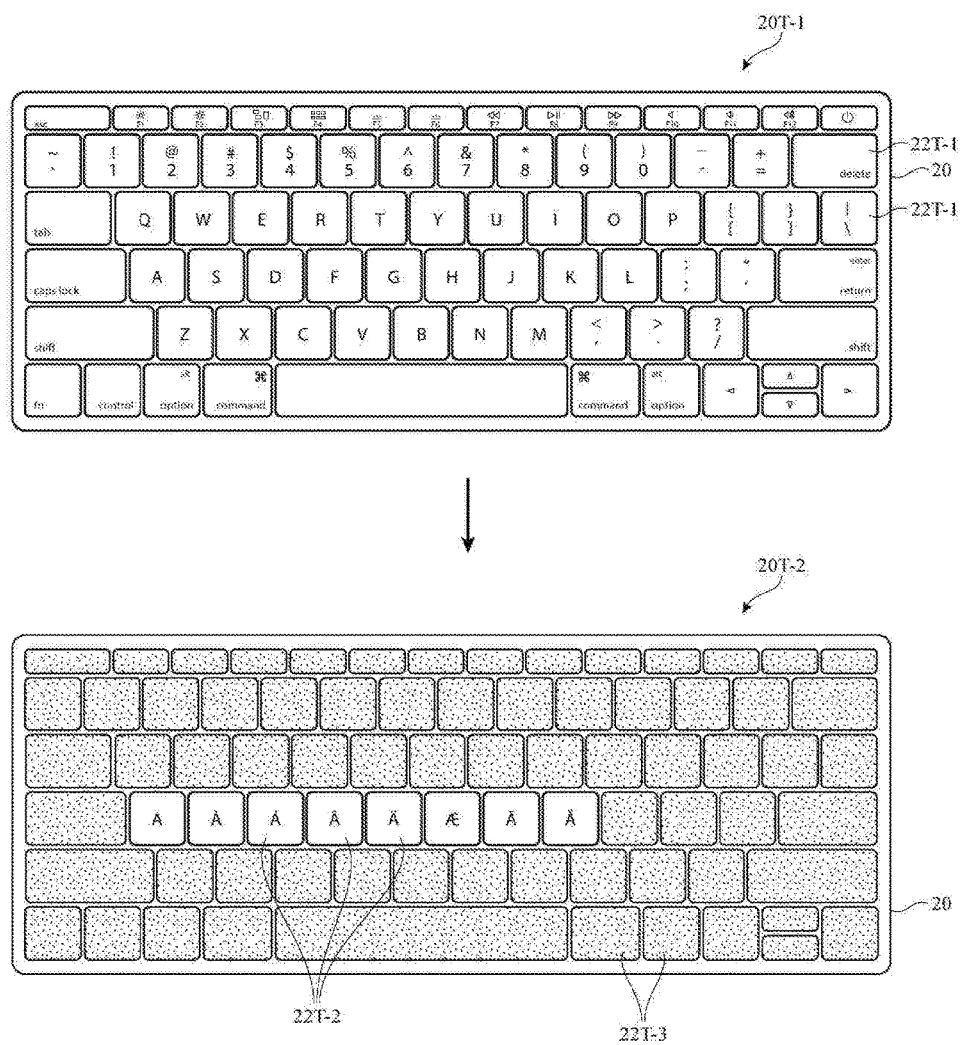
FIG. 8 is a diagram showing how virtual reality key labels that overlap keys on a physical keyboard may be varied to provide a user with accented keys and other options in accordance with an embodiment.

FIG. 8 is a diagram of an illustrative keyboard showing how virtual key labels may be altered during operation. Initially, a user may be presented with a virtual keyboard such as virtual keyboard 20T-1 that has a normal set of English alphabet key labels 22T-1 each of which is overlaid on top of a corresponding physical keyboard key 22 on physical keyboard 20. When the user supplies suitable input, display 12 updates the virtual keyboard content so that virtual keyboard keys 22T-2 are overlapped on top of keyboard keys 22 in updated virtual keyboard 20T-2. In this example, the user pressed and held virtual keyboard key "a", so virtual keyboard keys 22T include a set of letter options associated with the letter "a". In particular, keys 22T include accented versions of the letter "a" and related characters. In the FIG. 8 example, the accented versions of the letter "a" extend in a strip starting with the key adjacent to the letter "a". Each of keys 22T may be overlaid on top of a respective one of keys 22. A desired one of keys 22T may be selected by the user by pressing an appropriate one of these keys. Once selected, the selected key may be displayed in a virtual document being composed by the user or other suitable action may be taken. In the FIG. 8 example, virtual keys 22T-3 are covered with featureless areas (e.g., solid white areas without text, black areas, gray areas, etc.). Other types of virtual key patterns may be supplied to inactive keys in keyboard 20, if desired. For example, an arrangement of the type shown in FIG. 8 may be used to supply a user with customized keyboards for different languages, customized keyboards for different games and/or other software applications, etc.

Figure 9:
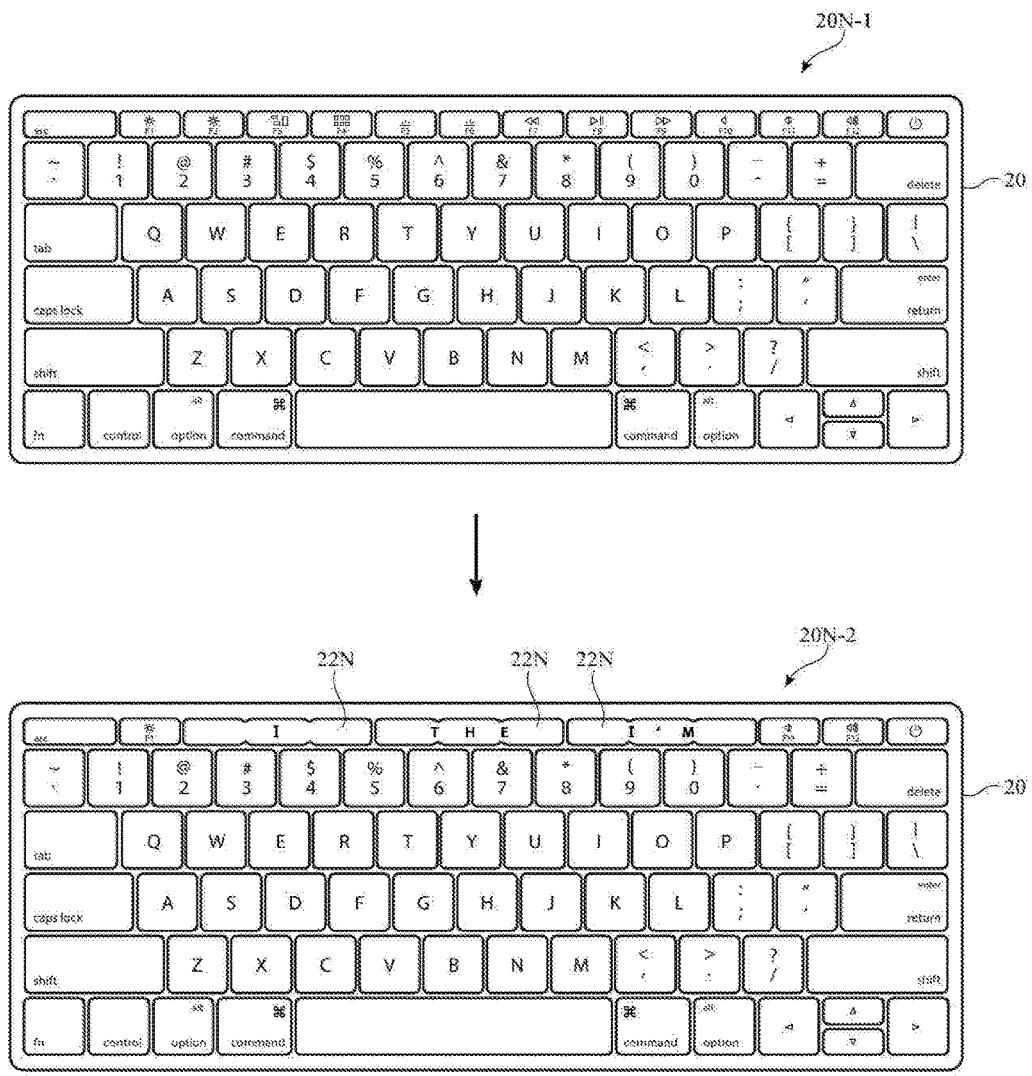
FIG. 9 is a diagram showing how virtual reality key labels on a physical keyboard may be varied to provide a user with autocomplete word options in addition to normal alphanumeric key labels in accordance with an embodiment.

FIG. 9 shows how display 12 may display autocorrect suggestions during use of keyboard 20. In this example, display 12 is initially displaying virtual keyboard 20N-1. Virtual keyboard 20N-1 includes a full set of English alphabet keys (alphanumeric keys). Each virtual key in keyboard 20N-1 may be overlaid on top of a respective physical key in keyboard 20. A user may use this keyboard to input text for a document in an email application or other messaging application, a word processing application, or other application. While typing, control circuitry 34 may compare partial and/or full words and/or phrases that have been entered by the user to a database containing grammatical data (commonly used words, common errors, spelling data, historical text from the user, etc.). The comparison operations performed by control circuitry 34 may be used to recommend automatic (auto) corrections to the user's document. These corrections, which may sometime be referred to as word replacements, predictive text suggestions, autocorrect suggestions, or replacement suggestions, may each be overlaid over one or more keys 22 in keyboard 20, as shown in updated virtual keyboard 20N-2 of FIG. 9. In the FIG. 9 example, predictive text suggestions 22N (i.e., "I," "The," and "I'm") have been overlaid on top of three different pairs of keys 22 (i.e., keys 22 in the function key row of keyboard 20). This is merely illustrative. Predictive text options may be displayed on any suitable keys 22 in keyboard 20.

Figure 10:
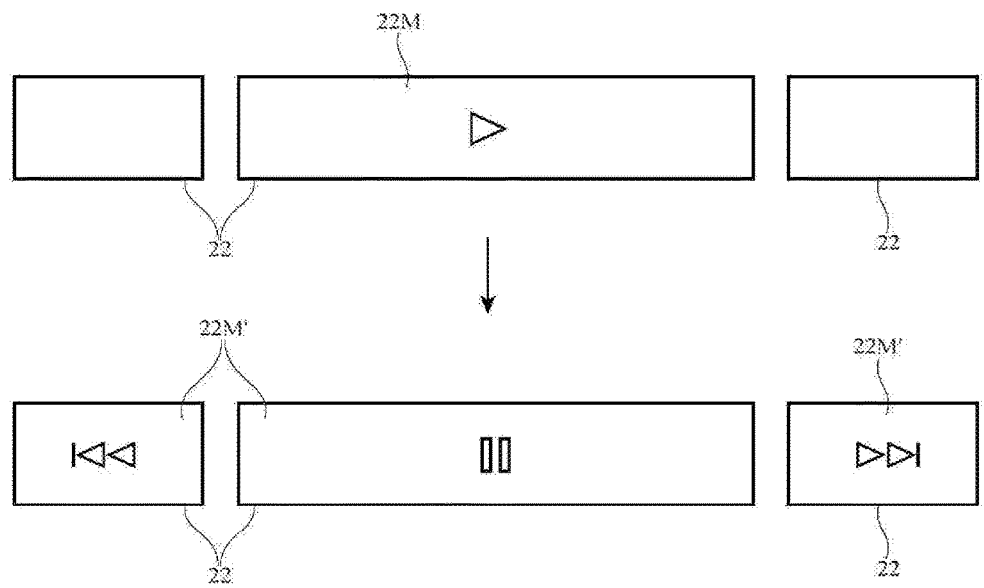
FIG. 10 is a diagram showing how virtual reality key labels may be dynamically varied to reflect currently available key functions in accordance with an embodiment.

As shown in FIG. 10, a virtual keyboard may be updated in real time based on the current state of an application running on control circuitry 34. In the FIG. 10 example, a user is using a media playback application in system 10. Video or other content is being presented to the user with display 12 and/or speakers in input-output devices 14. At the same time, display 12 may overlay virtual key labels 22M on keys 22 (e.g., a spacebar key and adjacent keys such as the keys immediately to the left and right of the spacebar key). Initially, media playback is paused, so a user is presented with a key label 22M on the spacebar that informs that user that a keypress on the spacebar will commence media playback operations (i.e., label 22M is a "play" icon). Keys adjacent to the spacebar may be covered with blank areas (as an example). In response to detection of a user key press on the space bar, control circuitry 34 can update the virtual key labels to labels 22M'. In this example, the key press on the space bar directed system 10 to play media for the user. While media is playing, virtual key labels 22M' may be presented that inform the user that the user may rewind, pause, or fast forward media playback by pressing appropriate keys 22. Virtual key labels 22M' may be overlaid on any suitable keys 22 in keyboard 20 (e.g., a set of keys adjacent to the pressed spacebar, etc.). Virtual key labels such as key labels 22M' may include a set of user-selectable options related to media playback (when a media playback application is running, related to word processing (when a word processing application is running, related to file management (when an operating system function is running), related to game options (when a game is running), etc.

Figure 11:
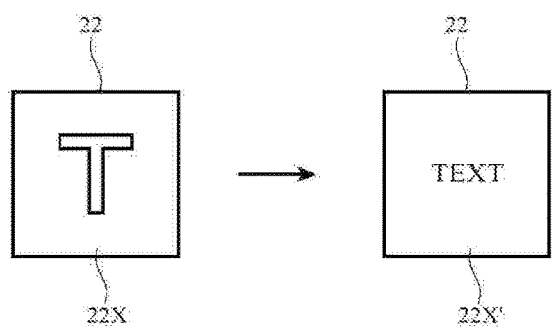
FIG. 11 is a diagram showing how a virtual reality key label may be varied to reflect a change in key operation in accordance with an embodiment.

FIG. 11 shows how display 12 may initially display a virtual alphanumeric key label 22X on key 22. Following the launching of a particular software application such as a media creation application or in response to a user key press input on key 22, display 12 may present the user with updated virtual key labels such as "text" key label 22X' of FIG. 11 that inform the user of particular software options available to the user. A set of one or more virtual key labels including the virtual key label for the pressed key and one or more adjacent keys may be updated without updating the entire set of virtual keys in a virtual keyboard. If the user presses key 22 of FIG. 11 while the virtual "text" option 22X' is being displayed, system 10 will perform a text-related function (e.g., the application running on control circuitry 34 may open a text entry box in the user's virtual workspace on display 12). Other types of virtual key labels may be displayed (e.g., media playback controls, content editing controls, document manipulation controls, communications-related controls, etc.). The example of FIG. 11 is merely illustrative.

Figure 12:
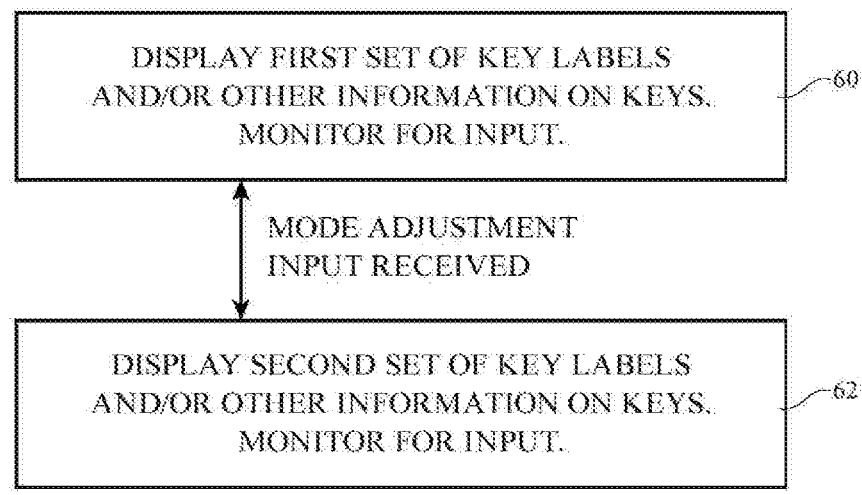
FIG. 12 is a flow chart of illustrative steps involved in presenting dynamically varying virtual reality content to a user such as virtual reality key labels that are overlapped on top of physical keys in a keyboard in accordance with an embodiment.

Illustrative steps involved in operating system 10 so that a user is presented with appropriate virtual key labels on keyboard 20 or other appropriate virtual reality content overlaid on top of one or more real-world input-output devices such as input-output devices 14 and/or 14' of FIG. 1 are shown in FIG. 12.

At step 60, control circuitry 34 of system 10 directs display 12 to display a first set of virtual reality key labels over keys 22 of keyboard 20 or directs display 12 to display other images overlaid on top of one or more corresponding input-output devices 14 and/or 14'. For example, each key 22 in physical keyboard 20 may be provided with a corresponding alphanumeric character, function key label, or other virtual symbol. The virtual key labels that are displayed during the operations of step 60 may or may not match physical key labels on physical keyboard 20. While virtual key labels are being displayed for the user, circuitry 34 may monitor keys 22 in keyboard 20 for key press input. In response to detecting a key press event (e.g., a key press, a press-and-hold event, a key press combination of multiple keys, a key press pattern, etc.), or in response to other input (e.g., detection of an application state change, detection of input to a microphone, gesture sensor, touch sensor, force sensor, or other input component in input-output devices 14 and/or 14'), system 10 may adjust the mode of the currently running application on system 10 and/or may update the virtual content being displayed by display 12 (step 62). In particular, system 10 may, during the operations of step 62, display a second set of virtual key labels on respective keys 22 in physical keyboard 20. The second set of virtual key labels may include key labels that indicate that different available alphanumeric characters are available on keyboard 20 or may include key labels associated with new software functions, word suggestions, media playback options or other selectable options in an application running on circuitry 34, etc.

Figure 13:
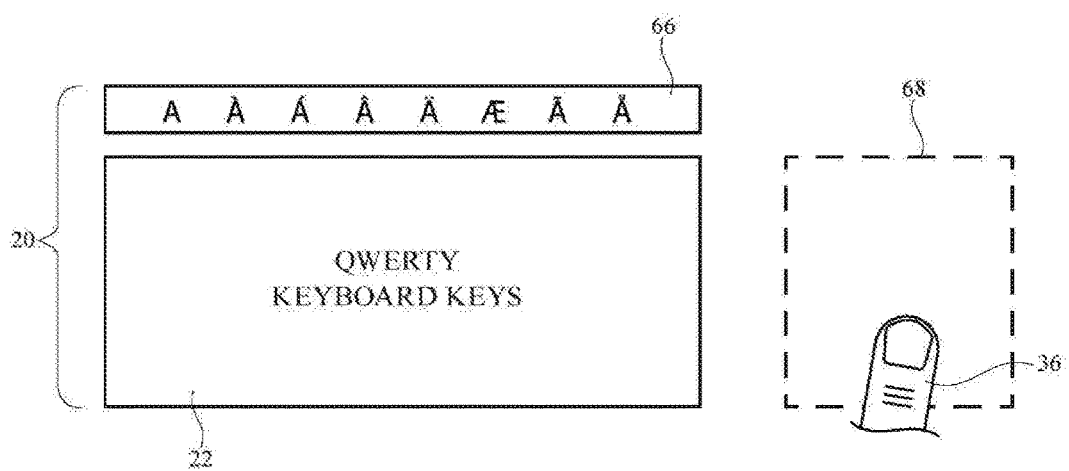
FIG. 13 is a diagram showing how a keyboard may have a touch screen display that presents accented letter options and other context-dependent options as a user supplies input to a physical keyboard in accordance with an embodiment.

If desired, content may be presented to a user on a display mounted on keyboard 20 (e.g., a strip-shaped display such as display 66 of FIG. 13). This type of display, which may sometimes be referred to as a dynamic function row, may be a touch screen display and may be used to display a user of physical keyboard 20 with a set of reconfigurable soft key options. In the context of typing scenarios such as the scenario of FIG. 8, touch screen display 66 may display user-touch-selectable accented letter options and other options in respond to detecting that a user has supplied appropriate key press input (e.g., pressing and holding the "a" key in the present example). The user of system 10 in this scenario need not be viewing virtual reality content with display 12, but rather may be viewing keyboard 120 of FIG. 13 directly. In scenarios in which display 12 is being use to display virtual reality content to the user, display 12 may display virtual key labels (e.g., accented letter options, etc.) that are overlaid on display 66 of keyboard 20. Display 12 may also display a virtual trackpad such as virtual trackpad (touch pad) 68 of FIG. 13. A camera, data glove, or other input device in input-output devices 14 and/or 14' may be used to detect user gestures and/or other input from a user (e.g., user finger 36) in virtual trackpad area 68.

Figure 14:
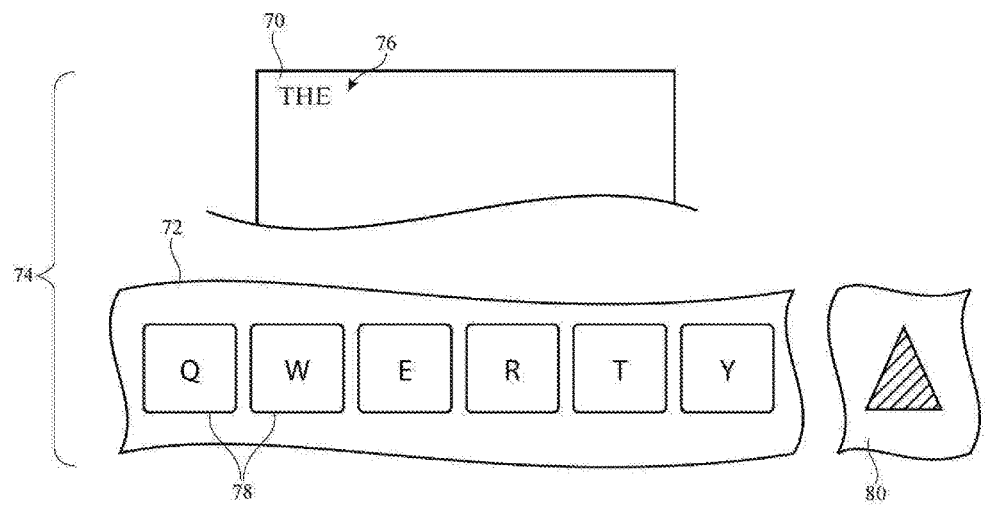
FIGS. 14 and 15 are diagrams showing how virtual reality content and corresponding touch screen display content may differ in accordance with an embodiment.
Figure 15:
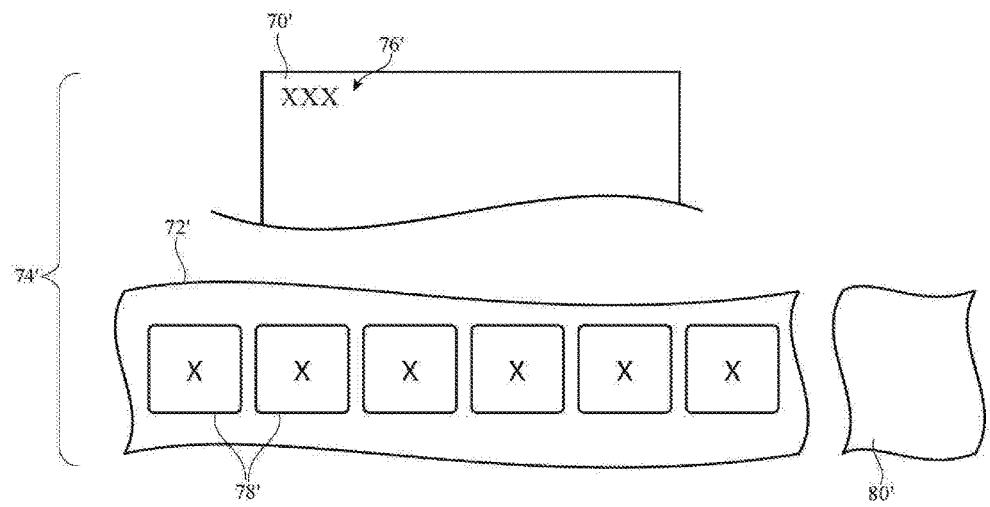

FIGS. 14 and 15 show how privacy may be maintained by using display 12 to present visual information to a user while displaying different content to others. In this example, a user is supplying touch input (e.g., key input) to key areas on a touch screen display (e.g., a touch screen display in electronic devices 16 such as a tablet computer, display 66 of FIG. 13, etc.). To assist the user when entering touch input to the touch screen display, display 12 may display a virtual keyboard such as virtual keyboard 72 with virtual alphanumeric keys 78 and/or other virtual selectable options overlaid on the touch screen display. The visible content displayed for the user by display 12 (i.e., virtual content 74) in this arrangement may include virtual keyboard 72 and virtual keyboard keys (virtual key labels) 78 overlaid on the touch screen display. The virtual keyboard key labels on the touch screen may also include key option labels such as virtual keyboard key label 80. While the user is supplying touch input to the touch screen, control circuitry 34 may be directing display 12 to display corresponding virtual characters 76 on virtual document workspace 70 (also sometimes referred to as a virtual document, virtual display, etc.).

At the same time that virtual content 74 is being displayed for the user and while touch input from the user is being gathered using the touch screen display that is being overlaid with virtual keyboard 72, the touch screen display may display information 74' of FIG. 15. Information 74' may include document 70', text 76' (which may consist of "X" characters or other dummy characters), keyboard 72' and keys 78' and 80', which may have dummy key labels). Information 74' may be static, may be updated with dummy characters or other predetermined information (i.e., information that is not related to the information of virtual document 70 in the user's virtual reality world and which therefore does not reveal text 76 of document 70), may contain only black content, or may contain other information that differs from the content being viewed by the user, thereby ensuring that the contents of document 70 remains private for the user.

Figure 16:
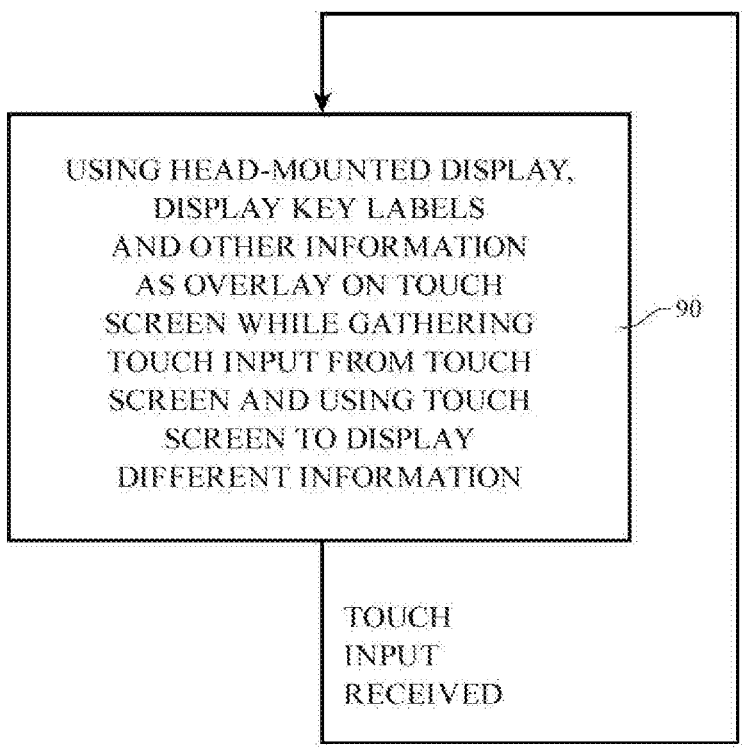
FIG. 16 is a flow chart of illustrative operations that may be performed when gathering touch screen input in a virtual reality system in accordance with an embodiment.

Illustrative operations involved in gathering touch screen input while displaying virtual reality content that is overlaid with a touch screen display are shown in the flow chart of FIG. 16. As shown by the operations of block 90 in FIG. 16, control circuitry 34 may use display 12 to display virtual reality content for a user while gathering touch input from a user using a touch screen display. The virtual reality content may include a virtual keyboards with virtual key labels of the type shown in FIG. 14 and/or other content that is overlaid on top of a physical touch screen display. The user may supply touch input to the portions of the touch screen display that are associated with the virtual key labels on the display. As touch input is received, the control circuitry of system 10 may update virtual text in a virtual document displayed by display 12. The touch screen display may display the same content that is being displayed for the user by display 12 or privacy may be maintained by displaying only content on the touch screen display that does not reveal the virtual text of the virtual document being displayed for the user by display 12. The content displayed on the touch screen may be dummy text, images, a screen saver, a blank screen, or other information that differs from the content being displayed to the user with display 12. This process (the operations of block 90) may be performed continuously. Each time a user supplies additional touch input to the touch screen display, control circuitry 34 may direct display 12 to update the user's virtual document accordingly, but need not direct the touch screen display to display the same information.

The foregoing is merely illustrative and various modifications can be made to the described embodiments. The foregoing embodiments may be implemented individually or in any combination.

What is claimed is:

1. A system, comprising:
   a physical keyboard having physical keys;
   a head-mounted display; and
   control circuitry configured to communicate with the physical keyboard and the head-mounted display, wherein the control circuitry is further configured to:
   receive key press input from a user with the physical keyboard;
   display a virtual keyboard overlaid on the physical keyboard with the head-mounted display, wherein the virtual keyboard includes virtual key labels each of which is overlaid on top of a respective one of the physical keys;
   receive a given key press input on a given physical key of the physical keys, wherein a virtual key label overlaid on top of the given physical key is associated with a letter; and
   display an updated set of virtual key labels in response to receiving the given key press input, wherein the updated set of virtual key labels includes a set of accented versions of the letter that are overlaid on physical keys adjacent to the given physical key and wherein the updated set of virtual key labels includes featureless areas without text that are overlaid on the remaining physical keys.

2. The system defined in claim 1 further comprising an input-output device, wherein the control circuitry is configured to gather input from at least one finger of the user in a virtual trackpad region using the input-output device.

3. The system defined in claim 2 wherein the input-output device comprises a camera.

4. The system defined in claim 1 wherein the system comprises a sensor configured to gather sensor input from the user and wherein the control circuitry is configured to direct the head-mounted display to display virtual reality content for the user in response to the gathered sensor input.

5. The system defined in claim 4 wherein the sensor comprises a sensor selected from the group consisting of: a proximity sensor, a light-based sensor, a capacitive sensor, a touch sensor, a force sensor, a data glove sensor, and a camera.

6. A system, comprising:
   a physical keyboard having physical keys;
   a head-mounted display; and
   control circuitry configured to communicate with the physical keyboard and the head-mounted display, wherein the control circuitry is further configured to:
   receive key press input from a user with the physical keyboard;
   display a virtual keyboard overlaid on the physical keyboard with the head-mounted display, wherein the virtual keyboard includes virtual key labels each of which is overlaid on top of a respective one of the physical keys;
   receive a given key press input on a given physical key of the physical keys, wherein a media playback key label is overlaid on top of the given physical key; and
   display an updated media playback key label overlaid on the given physical key in response to the given key press input.

7. The system defined in claim 6, wherein the media playback key label is a play icon and the updated media playback key label is a pause icon.

8. A system, comprising:
   a physical keyboard having physical keys;
   a head-mounted display; and
   control circuitry configured to communicate with the physical keyboard and the head-mounted display, wherein the control circuitry is further configured to:
   receive key press input from a user with the physical keyboard;
   display a virtual keyboard overlaid on the physical keyboard with the head-mounted display, wherein the virtual keyboard includes virtual key labels each of which is overlaid on top of a respective one of the physical keys; and
   update the virtual key labels to include a virtual key label that is overlaid on top of at least two adjacent physical keys in response to receiving a given key press input.

9. The system defined in claim 8, wherein the virtual key label that is overlaid on top of the at least two adjacent physical keys is an autocorrect suggestion.

10. The system defined in claim 8, wherein the virtual key label that is overlaid on top of the at least two adjacent physical keys is a predictive text suggestion.

\* \* \* \* \*